United States Patent [19]

Lindner et al.

[11] Patent Number: 4,960,864
[45] Date of Patent: Oct. 2, 1990

[54] PROCESS FOR RECOVERING THERMOPLASTIC POLYMERS FROM DISPERSION

[75] Inventors: Christian Lindner, Cologne; Claus Wulff, Krefeld; Karl-Heinz Ott, Leverkusen, all of Fed. Rep. of Germany

[73] Assignee: Bayer Aktiengesellschaft, Leverkusen, Fed. Rep. of Germany

[21] Appl. No.: 358,954

[22] Filed: May 30, 1989

Related U.S. Application Data

[63] Continuation of Ser. No. 12,601, Feb. 9, 1987, abandoned.

[30] Foreign Application Priority Data

Feb. 22, 1986 [DE] Fed. Rep. of Germany ....... 3605798

[51] Int. Cl.$^5$ ............................ C08F 6/16; C08F 6/24
[52] U.S. Cl. .................................. 528/486; 528/487; 525/242; 525/243
[58] Field of Search ................ 528/486, 487; 523/352; 525/242, 243

[56] References Cited

U.S. PATENT DOCUMENTS

| | | | |
|---|---|---|---|
| 2,444,801 | 7/1948 | Arundale | 528/486 X |
| 2,953,554 | 9/1960 | Miller et al. | 528/486 |
| 2,961,290 | 11/1960 | Kolb | 264/184 |
| 3,780,138 | 12/1973 | Hassell et al. | 528/486 X |
| 4,267,278 | 5/1981 | Lindner et al. | 524/139 |

FOREIGN PATENT DOCUMENTS

| | | | |
|---|---|---|---|
| 19701 | 12/1980 | European Pat. Off. | 524/139 |
| 2178 | 5/1970 | France | 528/486 |

Primary Examiner—Joseph L. Schofer
Assistant Examiner—F. M. Teskin
Attorney, Agent, or Firm—Connolly and Hutz

[57] ABSTRACT

Recovery of thermoplastic polymer solids from dispersions thereof by coagulation and subsequent washing of the solids is improved by contacting the polymer in the coagulation stage or the washing stage or in both stages with at least one tricarboxylic acid of the formula

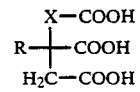

wherein X is a single covalent bond, —CH$_2$— or —C$_2$H$_4$— and R is H, —OH or

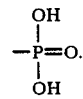

7 Claims, No Drawings

PROCESS FOR RECOVERING THERMOPLASTIC POLYMERS FROM DISPERSION

This is a continuation of application Ser. No. 012,601 filed Feb. 9, 1987, now abandoned.

The invention relates to an improved method for recovering thermoplastic polymers from their dispersion by precipitation (coagulation) and subsequent washing of the material obtained, in the presence of particular tricarboxylic acids.

Processing, in particular the precipitating agent, and the contaminants remaining in the polymer after the washing (in particular the residues of the precipitating agent), largely determine the properties of the thermoplastic polymer recovered.

The invention relates to a process for the recovery of thermoplastic polymers from dispersions in particular in aqueous media, wherein the polymer dispersion is coagulated in the presence of at least one tricarboxylic acid of the formula

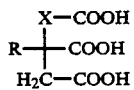

wherein
X=a single bond, —CH$_2$— or —C$_2$H$_4$— and

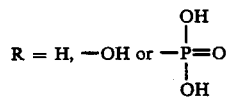

optionally in the additional presence of customary precipitating agents, and/or the coagulated thermoplastic polymer is washed with solutions of at least one tricarboxylic acid of the formula (I).

Preferred acids of the formula (I) are propanetricarboxylic acids and butane tricarboxylic acids; citric acid and 2-phosphonobutane-1,2,4-tricarboxylic acid are particularly preferred.

Thermoplastic polymers in the context of the invention are preferably those which are produced in dispersion by free radical polymerization in the presence of surface-active substances (emulsifiers) in particular of the anionic type.

Examples are homopolymers, interpolymers, and graft copolymers which have thermoplastic properties of olefinically unsaturated monomers such as styrene (and derivatives) acrylonitrile (and derivatives) alkyl methacrylates, alkyl acrylates, vinyl chloride, vinylidene chloride, vinylidene alkyl fluoride, ethylene, vinyl acetate, butadiene and isoprene; preferred are resinous polymers of vinyl chloride, styrene, α-methylstyrene, acrylonitrile, methacrylic acid C$_{1-6}$-alkyl esters and grafts of polymers of the above monomers on rubbers with glass transition temperatures of below 0° C., in particular at least partly cross-linked rubbers selected from diene rubbers, diene copolymer rubbers, acrylic rubbers, EPDM rubbers and ethylene copolymer rubbers. These polymers are known.

This invention furthermore relates to thermoplastic moulding materials which contain the above identified polymers. Preferred thermoplastics which can contain the polymers as components are PVC, SAN, polymethyl methacrylate, polystyrene, α-methylstyrene copolymers with acrylonitrile and/or methyl methacrylate, ABS, MBS, HIPS and polyamides.

The recovery proceeds according to the invention is described below in more detail.

The dispersions of the polymers, preferably in water, can be coagulated in known manner in a first variant of tho process according to the invention, for example by the addition of acids, such as acetic acid, formic acid, sulfuric acid or hydrochloric acid, and/or salts, such as NaCl, CaCl$_2$, MgSO$_4$, alum and KCl or by a temperature change or by the action of mechanical forces. The crude polymer is filtered off, if necessary, and subsequently washed with aqueous solutions containing at least one of the above tricarboxylic acids of the formula (I), in particular with 0.5–1.5% by weight aqueous solutions of these acids. After filtration and dehydration by means of, for example, suction filters, centrifuges or pressure band filters, the moist material thus treated is dried. This process can be carried out discontinuously, continuously or semicontinuously. The recovery process can be carried out in stages in succession (precipitation stages).

The entire recovery process is preferably carried out at temperatures (up to the drying stage) of 20° C. to 100° C. The coagulation stage is preferably carried out at temperatures of 70° to 100° C., and the washing operation is preferably carried out at temperatures of 20° to 70° C.

Another variant of the process can be carried out as follows; in this, the dispersions are coagulated directly in the presence of a tricarboxylic acid of the formula (I), i.e. solutions of at least one tricarboxylic acid of the formula (I) in water optionally together with customary coagulation agents, such as acetic acid, formic acid or sulfuric acid, and optionally together with salts, such as MgSO$_4$, NaCl, CaCl or Na$_2$SO$_4$, are employed as the coagulating agent. The concentration of acids of the formula (I) in these solutions is preferably 0.5–15% by weight. The coagulation itself can be carried out at temperatures of 20°–100° C. in particular at temperatures of 70° C. to 100° C. After intermediate filtration, if appropriate, the coagulated crude polymer is washed for purification with water or aqueous solutions of the acids of the formula (I).

The polymers obtained by the process according to the invention have improved natural color and stability towards heat (very low tendency to discolor then exposed to heat).

The polymers themselves furthermore have improved purity; their content of contaminants (for example residues of polymerization auxiliaries and coagulating agents) is particularly low, especially with regard to metal ions, in particular alkali metals and alkaline earth metals.

The polymers recovered according to the invention are particularly suitable for the production of thermoplastic articles in which purity, natural color and stability towards heat are of importance.

If requirements as to quality are only normal, the polymers can be processed at higher temperatures and pressures, i.e. more quickly. Their processing range, i.e. tolerance towards variations in processing conditions, such as temperature and residence time in the molten state is also improved.

EXAMPLES

I: Polymer emulsions employed (1) Latex of a graft copolymer of 80% by weight of polybutadiene rubber with an average particle diameter ($d_{50}$)=0.4 μ and 20% by weight of a copolymer of 10% by weight of n-butyl acrylate and 90% by weight of methyl methacrylate. Polymer solids content of the emulsion: 33% by weight.

(2) Latex of a graft polymer of 75% by weight of polybutadiene rubber with an average particle diameter ($d_{50}$) of 0.4 μ and 25% by weight of a copolymer of 26% by weight of acrylonitrile and 74% by weight of styrene. Polymer solids content of the emulsion: 5% by weight.

(3) Latex of a copolymer of 10% by weight of acrylonitrile, 55.5% by weight of methyl methacrylate and 4.5% by weight of α-methylstyrene;

$$\text{Staudinger index } [\eta] = 0.42 \frac{dl}{g},$$

measured in dimethylformamide at 25° C.

Polymer solids content of the emulsion: 5% by weight.

All the latices contain 2.5% by weight of phenolic antioxidants, based on the solid.

II. Working up of the emulsions (A) A mixture of 7,500 parts by weight of water, 150 parts by weight of $MgSO_4 \cdot H_2O$ (Epsom salt) and 150 parts by weight of an acid X are heated to 75° C., with stirring, Y parts by weight of latex (with a total solids content of 1,500 parts by weight) are uniformly metered in at this temperature, with stirring. The mixture is then subsequently heated at 97° C. for 15 minutes. After cooling, the product is washed in a laboratory centrifuge with a continuous washing device (diameter of the centrifuge chamber 30 cm, 1,400 minute$^{-i}$) under constant conditions (for 20 minutes). The product is then centrifuged dry for 5 minutes and the resulting polymer is dried 60° C. in the course of 48 hours in a circulating air drying cabinet.

minutes). It is then rinsed with a 1% strength by weight aqueous solution of an acid X (for 30 minutes). The product is then centrifuged dry for 5 minutes and worked up as described in II.A.

TABLE 2

| Example | Acid X employed | Alkaline earth/alkali metal content (ppm) | | |
|---|---|---|---|---|
| | | Mg | Na | K |
| 10* | acetic acid | 102 | 42 | 10 |
| 11 | citric acid | 60 | 10 | 7 |
| 12 | 2-phosphonobutane-1,2,4-tricarboxylic acid (50% % strength by weight solution in water) | 55 | 10 | 7 |

*comparison example

III: Properties of the polymers isolated

The metal contents (determined by atomic absorption spectroscopy, quoted in ppm) are determined as a measure of the degree of purity of the polymers isolated. The data are shown in Table 1 and Table 2.

The polymers worked up according to the invention (Examples 2, 3, 5, 6, 8, 9, 11 and 12) have substantially lower metal cation contents.

The polymers from Examples 7, 8 and 9 (see Table 1) (in each case 50 parts by weight) are compounded with in each case 50 parts by weight of PVC bulk polymer (K value of the PVC: 68), 0.2 part by weight of ®LOXIOL and 1.5 parts by weight of ®IRGASTAB 17 M are compounded on a roll mill at 185° C. in the course of 10 minutes. Sheets 4 mm thick are then produced from the compound by pressing at 190° C. in the course of 10 minutes.

The crude shade of the resulting sheets was then evaluated visually.

TABLE 3

| | Sheet of the compound with | |
|---|---|---|
| II. 7. | Discoloration | (−)** |

TABLE 1

| Example | Acid X employed | Y parts by weight | Latex | (Alkaline earth/alkali metal contents (ppm)) | | |
|---|---|---|---|---|---|---|
| | | | | Mg | Na | K |
| 1* | acetic acid | 4,545 | Latex I.1 | 95 | 30 | 8 |
| 2 | citric acid | 4,545 | " | 70 | 12 | 2 |
| 3 | 2-phosphonobutane-1,2,4-tricarboxylic acid (50% % strength by weight solution in water) | 4,545 | " | 65 | 10 | 2 |
| 4* | acetic acid | 4,286 | Latex I.2 | 120 | 50 | 10 |
| 5 | citric acid | 4,286 | " | 60 | 10 | 5 |
| 6 | 2-phosphonobutane-1,2,4-tricarboxylic acid (50% % strength by weight solution in water) | 4,286 | " | 58 | 11 | 4 |
| 7* | acetic acid | 4,167 | Latex I.3 | 150 | 60 | 12 |
| 8 | citric acid | 4,167 | " | 55 | 8 | 5 |
| 9 | 2-phosphonobutane-1,2,5-tricarboxylic acid (50% % strength by weight solution in water) | 4,167 | " | 60 | 10 | 4 |

*comparison examples (B) A mixture of 7,500 parts by weight of water, 150 parts by weight of $MgSO_4 \cdot H_2O$ (Epsom salt) and 150 parts by weight of acetic acid are heated to 75° C., with stirring. 4,545 parts by weight of latex I.1 are uniformly metered in at this temperature, with stirring. The mixture is then subsequently heated at 95°-97° C. for 15 minutes. After cooling, the product is washed in a laboratory centrifuge of the type described in II.A (for 15

| II. 8. | Discoloration | (+) |
| II. 9. | Discoloration | (++) |

**
++ no discoloration
+ almost no discoloration
− pronounced discoloration

We claim:

1. In an improved process for recovering a thermoplastic polymer from its dispersion by coagulation and subsequently washing coagulate so obtained, the improvement comprises contacting the thermoplastic polymer in the coagulation step, in the washing step, or in both steps with at least one tricarboxylic acid of the formula

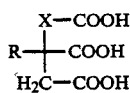

wherein X is a single bond, —CH$_2$—or —C$_2$H$_4$— and R is —H, —OH or

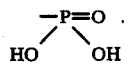

2. A process according to claim 1, in which the polymer is a homo- or copolymer of olefinically unsaturated monomers and/or graft copolymers of olefinically unsaturated monomers on rubber polymer(s) with a glass transition temperature of below 0° C.

3. A process according to claim 1, in which the dispersion is in an aqueous medium.

4. A process according to claim 1, in which the acid of formula (I) is a propanetricarboxylic acid, a butanecarboxylic acid, citric acid or 2-phosphonobutane-1,2,4-tricarboxylic acid.

5. A process according to claim 1 wherein contact of the thermoplastic polymer comprises adding the tricarboxylic acid to the dispersion prior to coagulation of the polymer.

6. A process according to claim 1 wherein contact of the thermoplastic polymer comprises washing the coagulated polymer with a solution of said tricarboxylic acid.

7. A process according to claim 6 wherein the solution of tricarboxylic acid is an aqueous solution containing 0.5 to 1.5% by weight of the tricarboxylic acid.

* * * * *